(12) United States Patent
Todd

(10) Patent No.: US 6,826,837 B2
(45) Date of Patent: Dec. 7, 2004

(54) VENTED SLEEVE FOR POWER CORDS

(75) Inventor: William M. Todd, 200 Cumberland Trace, Tullahoma, TN (US) 37388

(73) Assignee: William M. Todd, Tullahoma, TN (US)

( * ) Notice: Subject to any disclaimer, the term of this patent is extended or adjusted under 35 U.S.C. 154(b) by 131 days.

(21) Appl. No.: 10/223,429

(22) Filed: Aug. 19, 2002

(65) Prior Publication Data

US 2003/0041461 A1 Mar. 6, 2003

Related U.S. Application Data

(60) Provisional application No. 60/317,644, filed on Sep. 6, 2001.

(51) Int. Cl.$^7$ ............................ B26B 19/02; A01D 34/14
(52) U.S. Cl. ........................... 30/210; 174/136; 439/502
(58) Field of Search ............................ 30/210; 174/136; 439/502

(56) References Cited

U.S. PATENT DOCUMENTS

| | | | |
|---|---|---|---|
| 2,037,121 A | 4/1936 | Dean ............................ 83/785 |
| 3,173,519 A | 3/1965 | Sullivan ...................... 174/136 |
| 3,249,679 A | 5/1966 | Bogese ....................... 174/136 |
| 3,422,531 A | 1/1969 | Lill et al. ..................... 30/210 |
| 3,716,733 A | 2/1973 | Keith et al. ................. 174/136 |
| 4,723,822 A | 2/1988 | Merdic ........................ 439/502 |
| 4,970,351 A | 11/1990 | Kirlin ......................... 174/136 |
| 5,832,960 A | * 11/1998 | Amatsutsu et al. ......... 138/110 |
| 5,967,194 A | * 10/1999 | Martin ........................ 138/156 |
| 5,993,249 A | * 11/1999 | Benson, Jr. ................. 439/502 |
| 6,018,874 A | 2/2000 | Todd ............................ 30/210 |
| 6,240,967 B1 | 6/2001 | Levert et al. ............... 138/110 |

* cited by examiner

Primary Examiner—Hwei-Siu Payer
(74) Attorney, Agent, or Firm—Jenkens & Gilchrist

(57) ABSTRACT

A sleeve for surrounding a power cord, in whole or in part, for appliances such as hedge trimmers. The sleeve, preferably composed of a lightweight polymeric material in corrugated, convoluted, or similar form, has relatively large radial dimensions compared to the cord and therefore resists the insertion of the sleeve and the cord into appliances (such as a hedge trimmers cutting blades) thereby preventing damage to the sleeve and the cord and preventing other undesired results. The relatively large size of the sleeve tends to increase the user's awareness of the sleeve and cord. Also the sleeve's increased rigidity compared to the cord aids in preventing the cord from being entangled in the appliance and assists in managing and manipulating the cord. The sleeve includes at least one aperture to facilitate the dissipation of heat generated by the power cord.

15 Claims, 18 Drawing Sheets

US 6,826,837 B2

VENTED SLEEVE FOR POWER CORDS

RELATED APPLICATIONS

This application is related to and claims priority to U.S. Provisional Patent Application Ser. No. 60/317,644, filed Sep. 6, 2001, titled "Vented Sleeve For Power Cords," which is incorporated herein in its entirety.

FIELD OF THE INVENTION

The present invention relates generally to sleeves, jackets, covers, tubes, pipes, hoses, wraps, tapes, wire looms and conduits for use with cords, cables or wires. The present invention relates more particularly to sleeves or jackets, which provide protection to, and increase manageability of, cords, cables or wires, especially power cords for portable electrical tools or appliances that typically require relatively long cords in actual use.

SUMMARY OF THE INVENTION

It is a primary object of the present invention to provide a lightweight low-cost sleeve that can protect devices such as power cords, extension cords, cables or wires, such as the relatively long power cord typically used with electric hedge trimmers.

Another related object is to provide such an improved sleeve that is capable of enhancing the manageability of devices such as power cords, extension cords, cables or wires.

An additional object is to provide such an improved sleeve that is capable of increasing the user's awareness regarding the presence of devices such as power cords, extension cords, cables or wires.

A further object is to provide such a device that protects against general wear and tear on relatively long power cords used with certain electrical tools or appliances such as hedge trimmers, edging trimmers, floor buffers and vacuum cleaners.

Other objects and advantages of the invention will be apparent from the following detailed description and the accompanying drawings.

In accordance with the present invention, the foregoing objectives are realized by providing a sleeve to surround, or to incorporate with, in whole or in part, the device to be affected The sleeve is typically used with a portable electric tool having a driven element and an electrical power cord for connecting the tool to an electrical power source. The sleeve is adapted to fit onto at least a portion of the power cord and has a size, shape and material that protects the cord from damage in the event of accidental contact with the driven element.

The protective sleeve has a relatively large cross-section compared to the cross-section of the power cord or other element being protected. The invention reduces the likelihood of the power cord or other element being introduced into tools or appliances having moving or reciprocating parts, to prevent damage to the cord or other protected element and/or the appliance having the moving parts. This in turn thus prevents electrical hazards as well as maintaining the operability of the appliance with the moving parts. Furthermore, the sleeve provides rigidity to the cord or other protected element to aid in the manageability of both the cord and the powered device. The invention also allows for preventing the entanglement of the device with its corresponding appliance as described above. In addition, the invention's rigid exterior prevents abrasion of the device surrounded by the invention.

The conductors in electric cords have resistance to the flow of current through them. This resistance causes heat to generate along the entire length of the cord while being used This invention has a longitudinal slot along the entire length of the sleeve or vent holes along the entire length of the sleeve that allows air to pass through to dissipate heat by natural convection to prevent heat from becoming trapped in the sleeve and causing the cord to exceed its temperature rating. The longitudinal slot also allows the easy insertion and removal of the cord into the sleeve by the user or manufacturer. Sleeves with either a slot or vent holes are also more flexible and lightweight enough so as not to constrain the intended function of the cord. Other methods of venting the sleeve are also contemplated such as partial circumferential vents, scattered perforations or even a porous sleeve material.

DETAILED DESCRIPTION OF THE ILLUSTRATED EMBODIMENT

Figure 1:
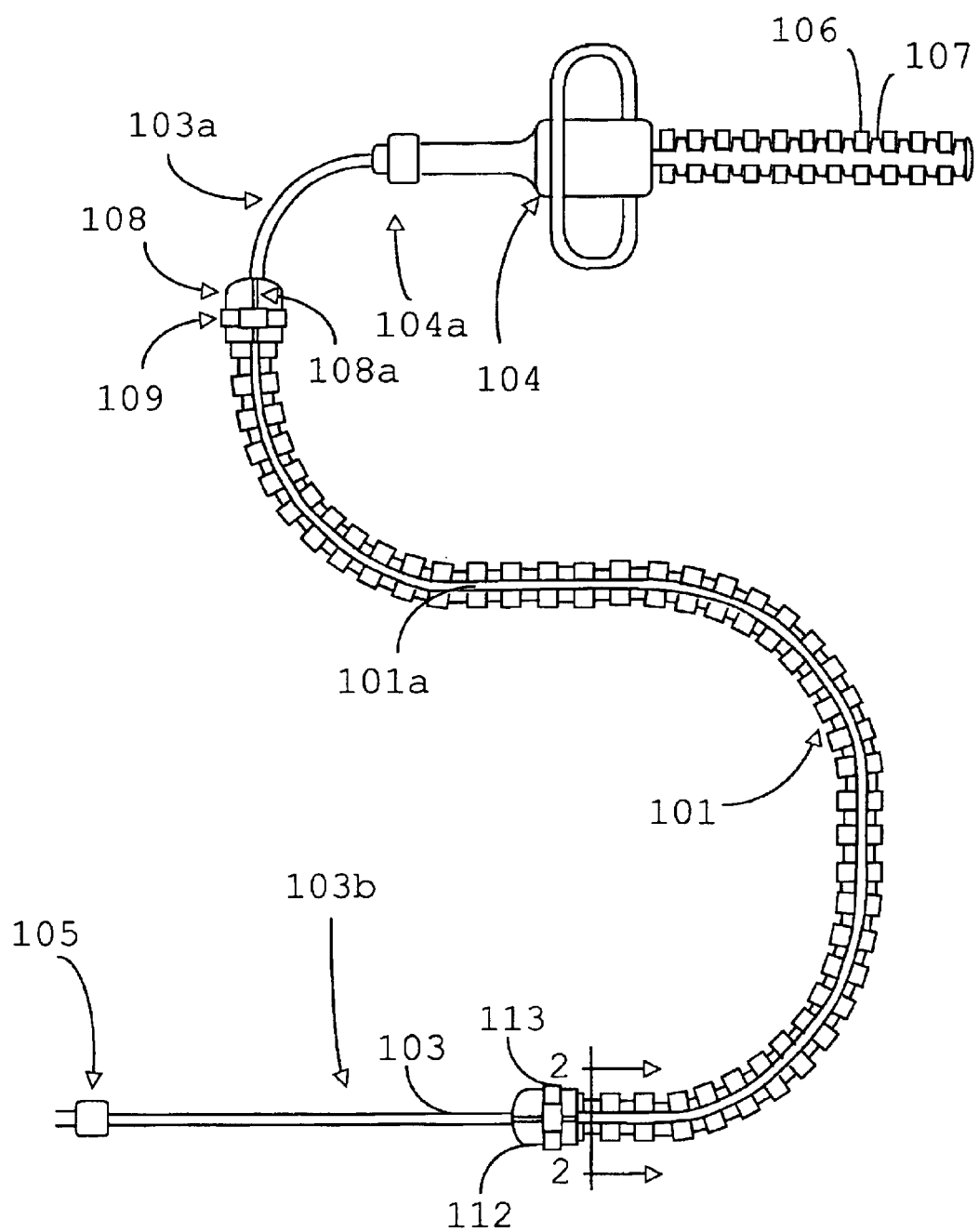
FIG. 1 is a drawing of a hedge trimmer and power cord that could be used with a slotted sleeve embodiment of the present invention.

While the invention is susceptible to various modifications and alternate forms, specific embodiments thereof have been shown by way of examples in the drawings and will be described in detail. It should be understood, however, that they are not intended to limit the invention to the particular forms described, but on the contrary, the intention is to cover all modifications, equivalents, and alternatives falling within the spirit and scope of the invention.

Turning now to the drawings, FIG. 1 is a drawing of a wire loom, Electrical Non-metallic Tubing (ENT), or corrugated hose, shown as sleeve 101, preferably resilient, semi-rigid, lightweight, and made from a polymeric material with fire retardant properties. Sleeve 101 partially surrounds an electric power cord 103 that corresponds to a typical electrically powered hedge trimmer 104. The slot 101 a allows heat, generated by the electric current passing through the cord 103, to escape from sleeve 101 by radiation and as air passes through slot 101a by natural convection. The width of slot 101a is slightly smaller than diameter of cord 103 to prevent cord 103 from inadvertently escaping out of sleeve 101.

In a preferred embodiment, slot 101a also allows for placing cord 103 into sleeve 101 by pulling away or prying on sleeve 101 at the slot 101a to further open slot 101a enough to allow inserting power cord 103 into the hollow region within sleeve 101. In an alternative embodiment, sleeve 101 has a diameter sufficiently large enough to allow sleeve 101 to slide over the plug or receptacle of power cord 103. In this embodiment, the user or manufacturer would simply slide sleeve 101 over the plug or receptacle and feed power cord 103 through the hollow region within sleeve 101. Alternatively, the plug or receptacle could be installed on power cord 103 after sleeve 101 has been installed over power cord 103. The invention also contemplates any other method of placing sleeve 101 over power cord 103.

Sleeve 101 is preferably attached to power cord 103 by end cap 108 and clamp 109 so as to fix the relative longitudinal positions of sleeve 101 and power cord 103. Cord 103 is placed into hole 108b (shown in FIG. 4) of end cap 108 by pulling away end cap 108 at slot 108a to further open slot 108a enough to allow cord 103 to be slipped through slot 108a and be seated into hole 108b. Sleeve 101 is preferably attached to end cap 108 by a ratcheting pull-tie, cable tie or clamp 109 that surrounds end cap 108 and clinches end cap 108 to sleeve 101 and to power cord 103 thereby preventing longitudinal movement of sleeve 101 relative to power cord 103. The clamp 109 may be loosened or removed to allow the sleeve 101 and end cap 108 to be removed from the cord 103, or even to allow the sleeve 101 to be adjusted, or moved longitudinally on the cord, and then replaced or retightened, in order to configure it for use with different appliances. It should also be noted that slot 108a allows heat to pass through it just as described for slot 101a. In an alternative embodiment, sleeve 101 is attached to power cord 103 by a two-piece end cap allowing the two pieces to be placed over the sleeve 101 and cord 103 and then being held together by a ratcheting pull-tie, cable tie or clamp 109. End cap 112 and clamp 113 are optional but may be installed as described for end cap 108 and clamp 109. Alternatively, the end cap 108 may be held in place by an adhesive or adhesive tape disposed between the end cap 108 and the sleeve 101 and possibly the adhesive or adhesive tape also applied between the end cap 108 and the cord 103. In another alternative embodiment, sleeve 101 is attached to power cord 103 by a grommet, that might even be slotted, split, or consist of two or more pieces, disposed in sleeve 101, around the enclosed power cord 103, such that sleeve 101 can be clinched around the grommet, and in turn against the cord 103, by a ratcheting pull-tie, cable tie or clamp 109, thereby preventing longitudinal movement of sleeve 101 relative to power cord 103. Alternatively, the grommet may be replaced with a bushing, reducer or adapter and the ratcheting pull-tie, cable tie or clamp 109 could be replaced with an adhesive or adhesive tape disposed between it and the sleeve 101 and possibly between the grommet and the cord 103 In another alternative embodiment, sleeve 101 is attached to power cord 103 by adhesive disposed between a portion of sleeve 101 and power cord 103, thereby preventing longitudinal movement of sleeve 101 relative to power cord 103. The invention also contemplates any other method of securing sleeve 101 to power cord 103 that prevents longitudinal movement of sleeve 101 relative to power cord 103.

Figure 2:
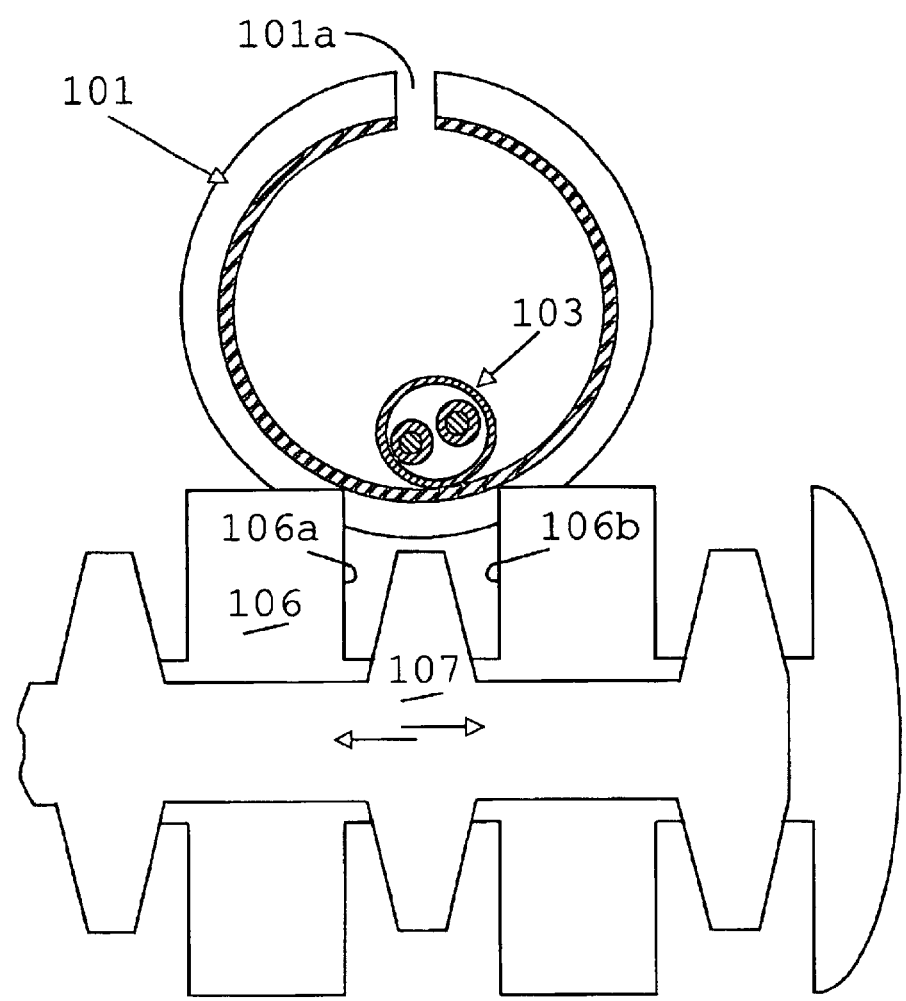
FIG. 2 is an enlarged cross-section of the sleeve and power cord taken generally along line 2—2 in FIG. 1 but includes an enlarged fragmentary side elevation view of a portion of the hedge trimmer blades shown in FIG. 1.

As can be seen most clearly in FIG. 2, the outside diameter of sleeve 101 is larger than the distance across the void in blade 106 measured between the surfaces 106a and 106b. Therefore, as sleeve 101 is introduced into this void, the semi-rigid properties of sleeve 101 prevent blade 106 from penetrating sleeve 101, thereby protecting power cord 103. Moreover, as sleeve 101 proceeds into the void, sleeve 101 is stopped, because of its diameter, after traveling only a short distance. Thus, sleeve 101 is prevented from contacting blade 107, thereby reducing the likelihood of damage to sleeve 101, power cord 103 and hedge trimmer blades 106 and 107.

Referring again to FIG. 1, segment 103a of power cord 103 need not be enclosed by sleeve 101 because the length of segment 103a is such that it cannot extend from cord attachment region 104a to blades 106 and 107 of hedge trimmer 104.

The segment 103b of power cord 103 is not enclosed by sleeve 101 because sleeve 101 need not extend along the entire length of power cord 103, to its end 105, in order to significantly reduce the likelihood of segment 103b contacting the blades 106 and 107 while the hedge trimmer 104 is in typical use. In typical use, segment 103b of power cord 103 is disposed on the ground, while only the segment of power cord 103 enclosed by sleeve 101 is suspended above the ground and potentially in proximity to hedge trimmer 104 and blades 106 and 107.

Figure 3:
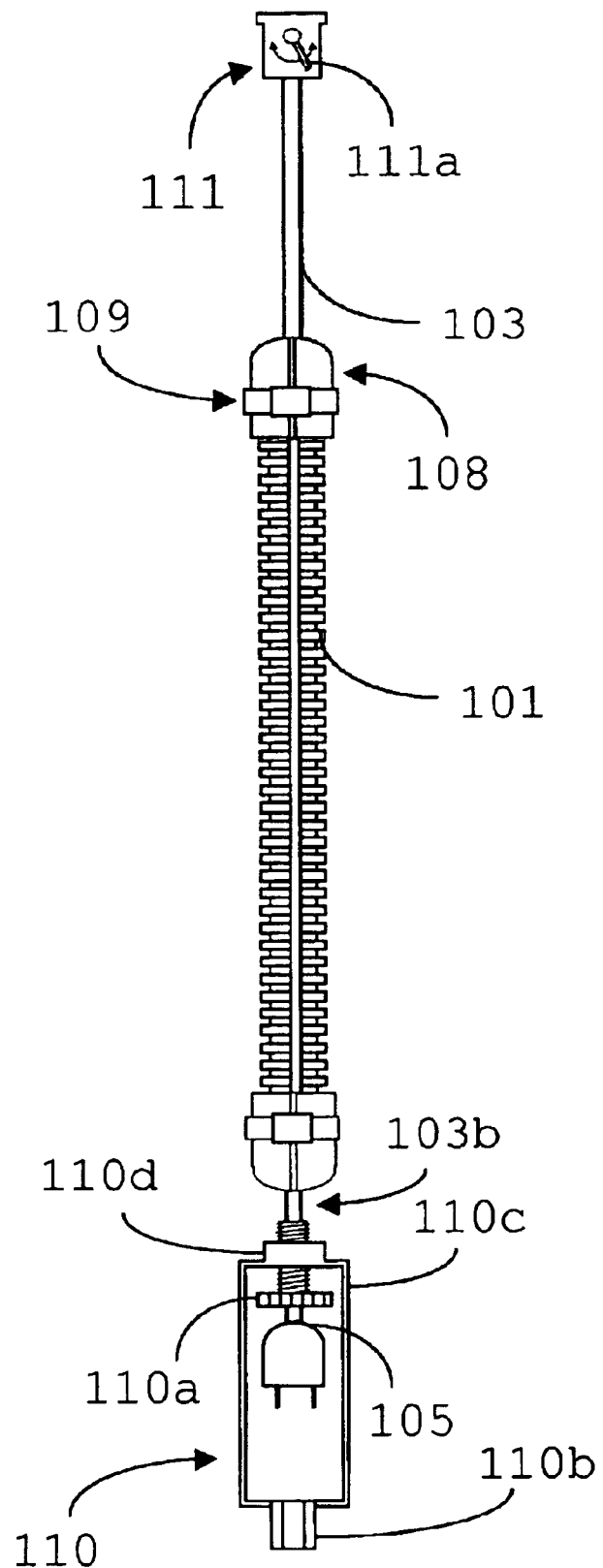
FIG. 3 is a drawing of a power cord with the slotted sleeve embodiment of FIG. 1 with optional accessories.

FIG. 3 shows a preferred embodiment of FIG. 1 and FIG. 2 with an optional latching/unlatching electrical connector receptacle 111. The receptacle 111 is latched onto the hedge trimmer 104, or other appliance, electrical blades or plug by flipping lever 111a after plugging receptacle 111 into the electrical blades or plug of the hedge trimmer 104 or other appliance. The receptacle 111 can be unlatched by flipping the lever 111a back to the original or unlatched position to allow removal of receptacle 111 from an appliance or hedge trimmer 104. Also shown in FIG. 3 is an optional user installable and removable extension cord coupler 110. The coupler helps to keep the cord 103 attached to an extension cord while the hedge trimmer 104, or other appliance, is in use. Once installed onto the cord 103 as shown, the user forces an extension cord into the slot 110b, oriented such that the extension cord electrical receptacle will be within the frame 110c. The extension cord receptacle is then plugged into the plug 105 and the jackscrew 110a is screwed such as to clinch them together between the jackscrew 110a and area of the frame 110c adjacent to the slot 110b. It should be noted that receptacle 111 and coupler 110 are shown as optional examples however; similar products are available from several manufactures and are contemplated as alternatives. These features reduce the likelihood of the electrical power from being inadvertently interrupted to the hedge trimmer or other appliance such as a chainsaw that can kickback dangerously if the power is unexpectedly removed and then restored.

Figure 4:
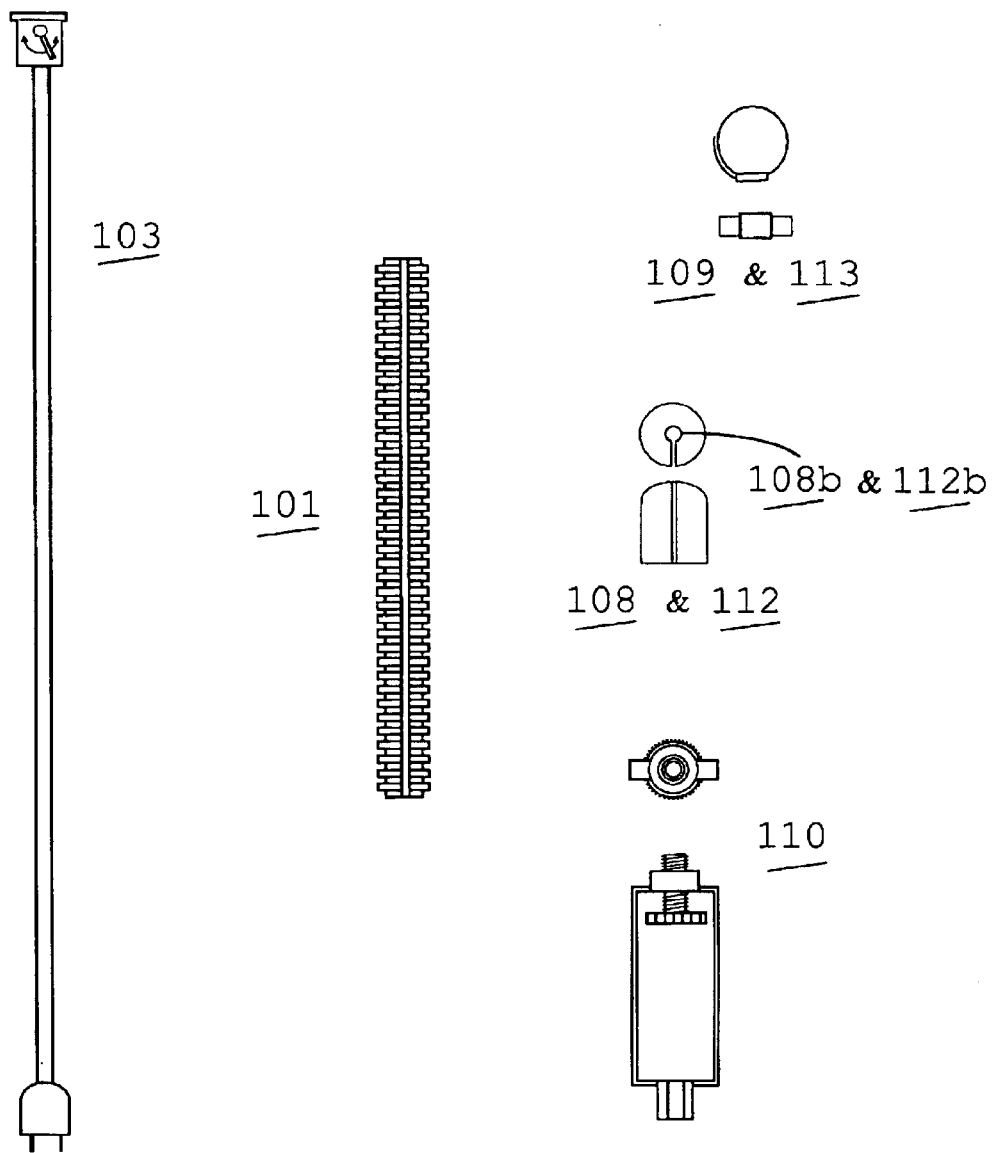
FIG. 4 is a drawing, similar to FIG. 3, with the components shown separately as in kit form.

FIG. 4 shows the individual components of the preferred embodiment of FIG. 3. The manufacturer may package any or all of these components together as a kit for user assembly or assemble them in their plant The user or manufacturer may assemble all of the components as shown in FIG. 3 or only the components desired. For instance, they may decide to install sleeve 103 onto the existing power cord of an appliance or an extension cord, and so on.

Figure 5:
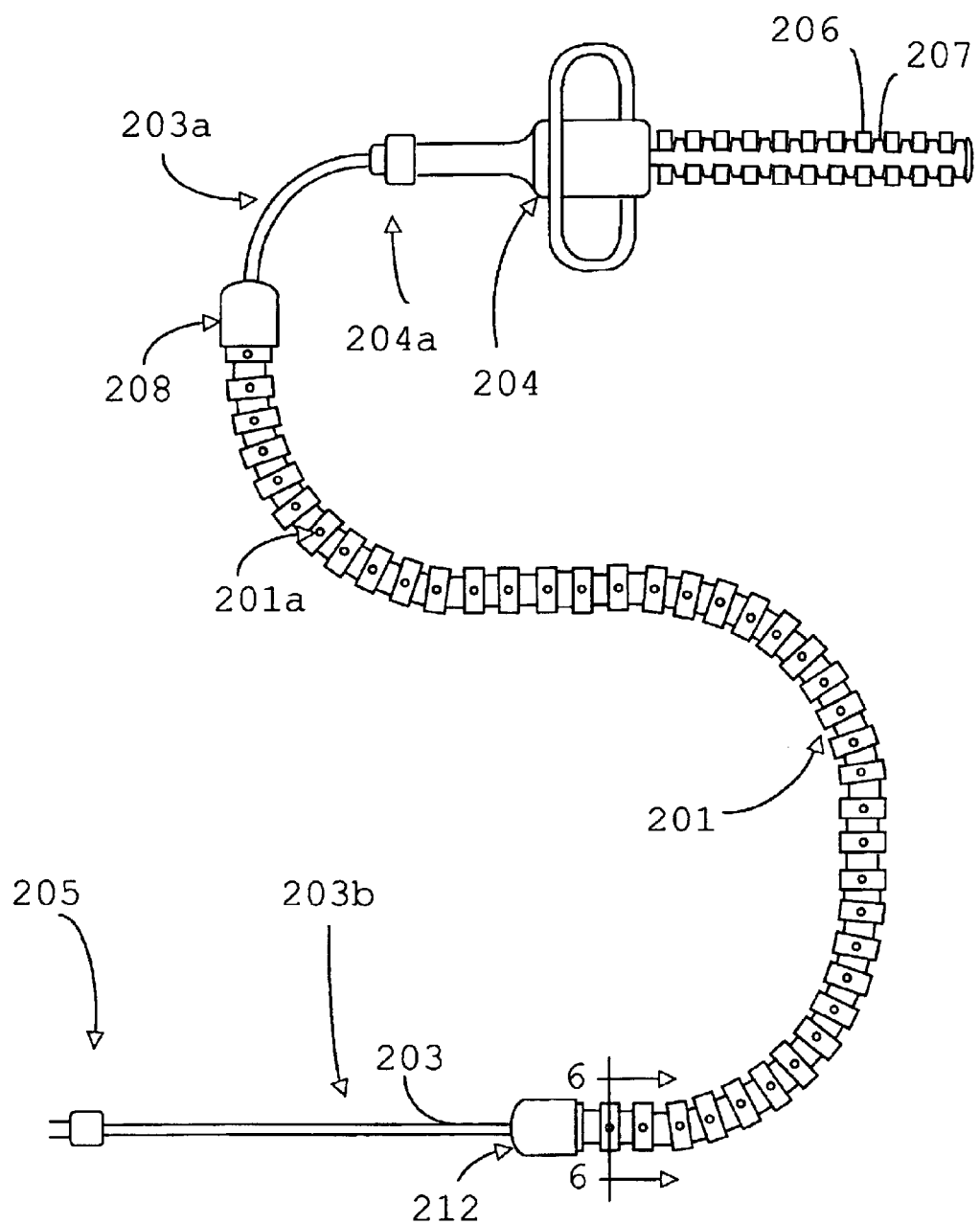
FIG. 5 is a drawing, similar to FIG. 1, of an alternative embodiment of the present invention wherein the sleeve is perforated with holes distributed along it's length.

FIG. 5 shows an alternative embodiment of the present invention with holes, such as hole 201a in sleeve 201 for venting heat as described above. This embodiment is primarily meant for manufacturer assembly since the plug 211 or receptacle 205 must be installed onto cord 203 after the cord 203 has been pulled or pushed longitudinally through the hollow region within sleeve 201, the hole in end cap 208, and the hole in end cap 212. End cap 208 and end cap 212 may be held to the sleeve 201, and in turn to the cord 203, by friction, ties, clamps or adhesive as described previously.

Figure 6:
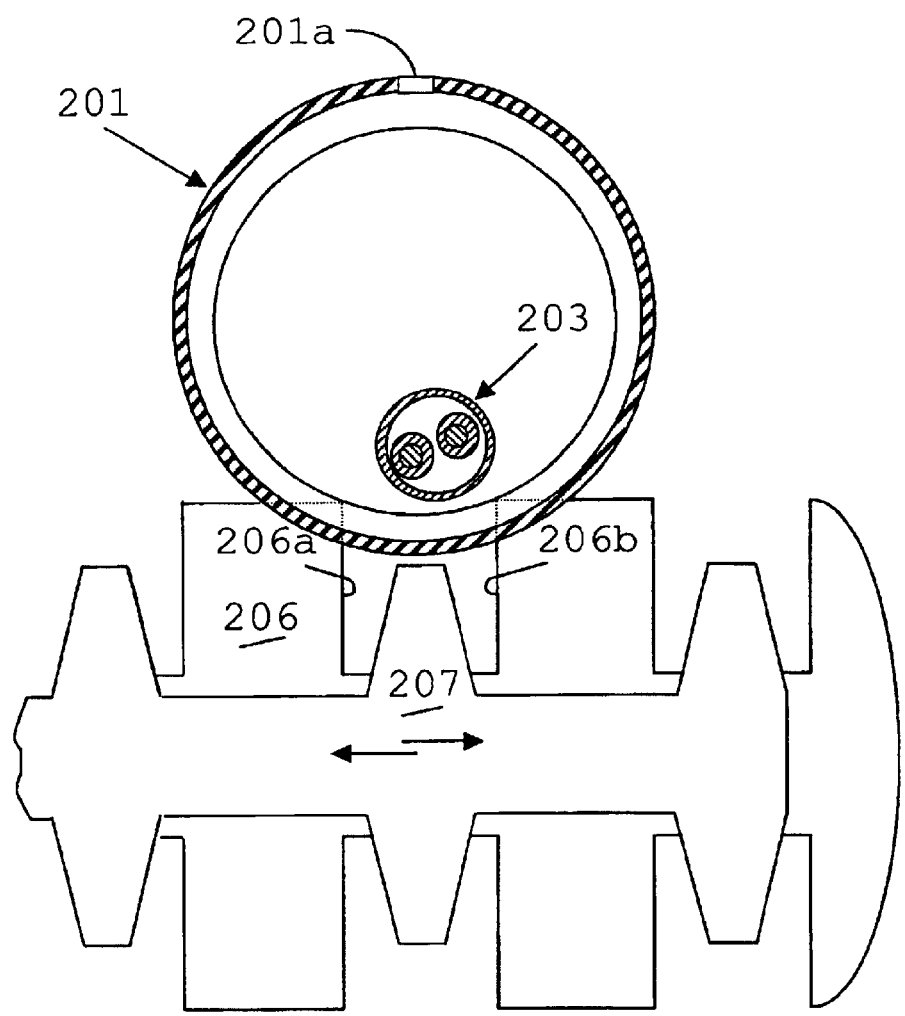
FIG. 6 is a drawing, similar to FIG. 2, with a cross-section taken generally along line 6—6 in FIG. 5.
Figure 7:
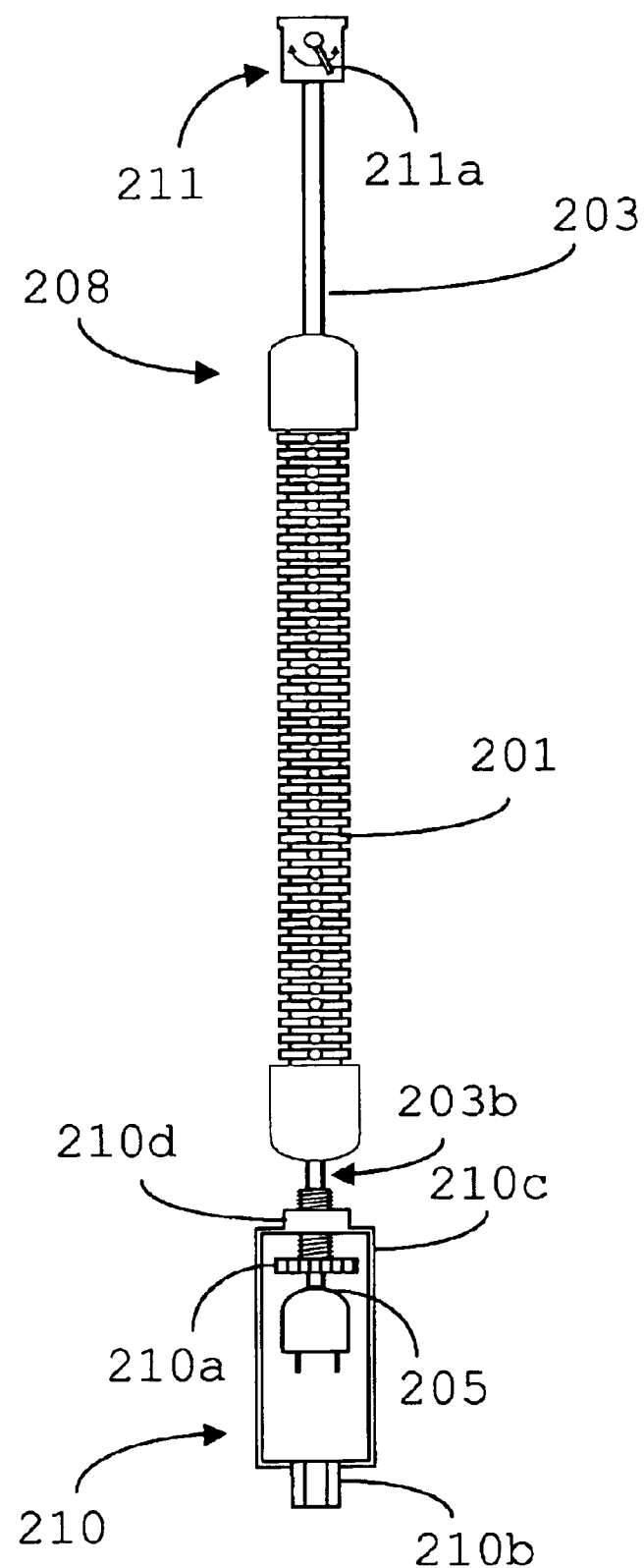
FIG. 7 is a drawing, similar to FIG. 3, showing the embodiment of FIG. 5 in a typical manufacturer assembled form.

FIG. 6 shows a cross section of the embodiment of the present invention shown in FIG. 5 that basically functions as described for the previous embodiment shown in FIG. 2 FIG. 7 shows the embodiment of FIG. 5 with optional features as previously described for the embodiment of FIG. 3.

Figure 8:
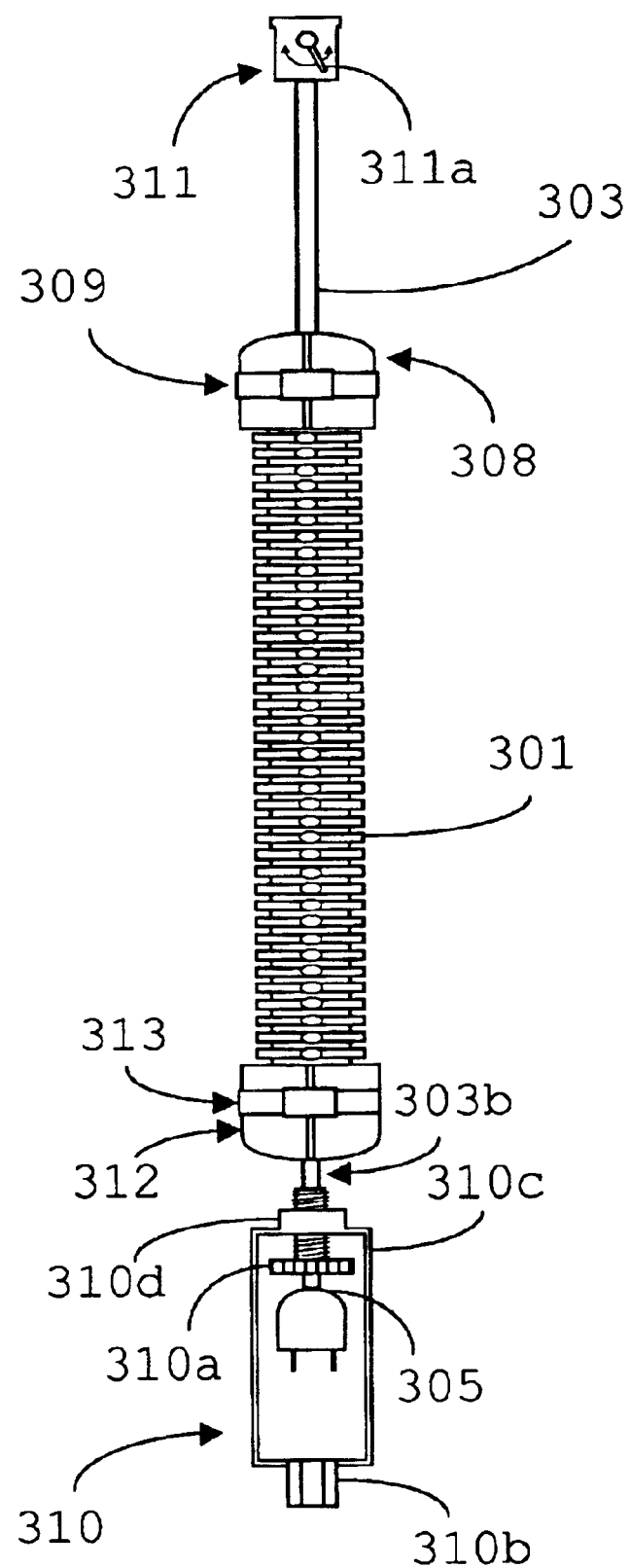
FIG. 8 is a drawing, similar to FIG. 3 and FIG. 7, depicting a sleeve with an inside diameter large enough for the cord's plug or receptacle to pass through it during assembly.

FIG. 8 shows another alternative embodiment of the present invention with sleeve 301 large enough for the receptacle 311 or plug 305 to be pushed or pulled longitudinally through the hollow region within it to allow the user assembly and disassembly. End cap 308, end cap 312, clamp 309, and clamp 313 may be installed as described for the embodiment of FIG. 1.

Figure 9:
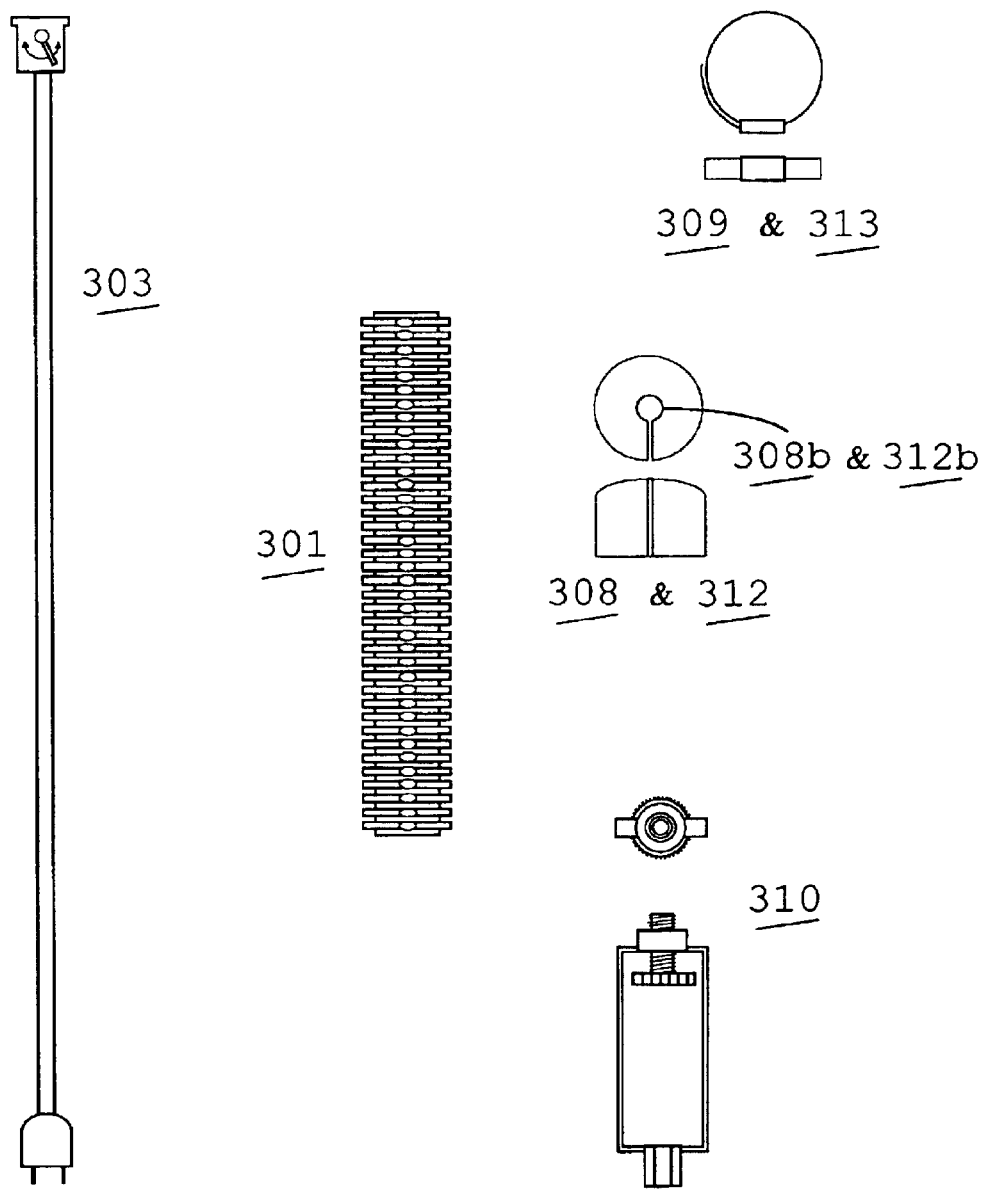
FIG. 9 is a drawing, similar to FIG. 4, showing the separate components of FIG. 8 as in kit form.

FIG. 9 depicts the components of the embodiment of FIG. 8 as may be provided in kit form similarly as described for the kit in FIG. 4.

Figure 10:
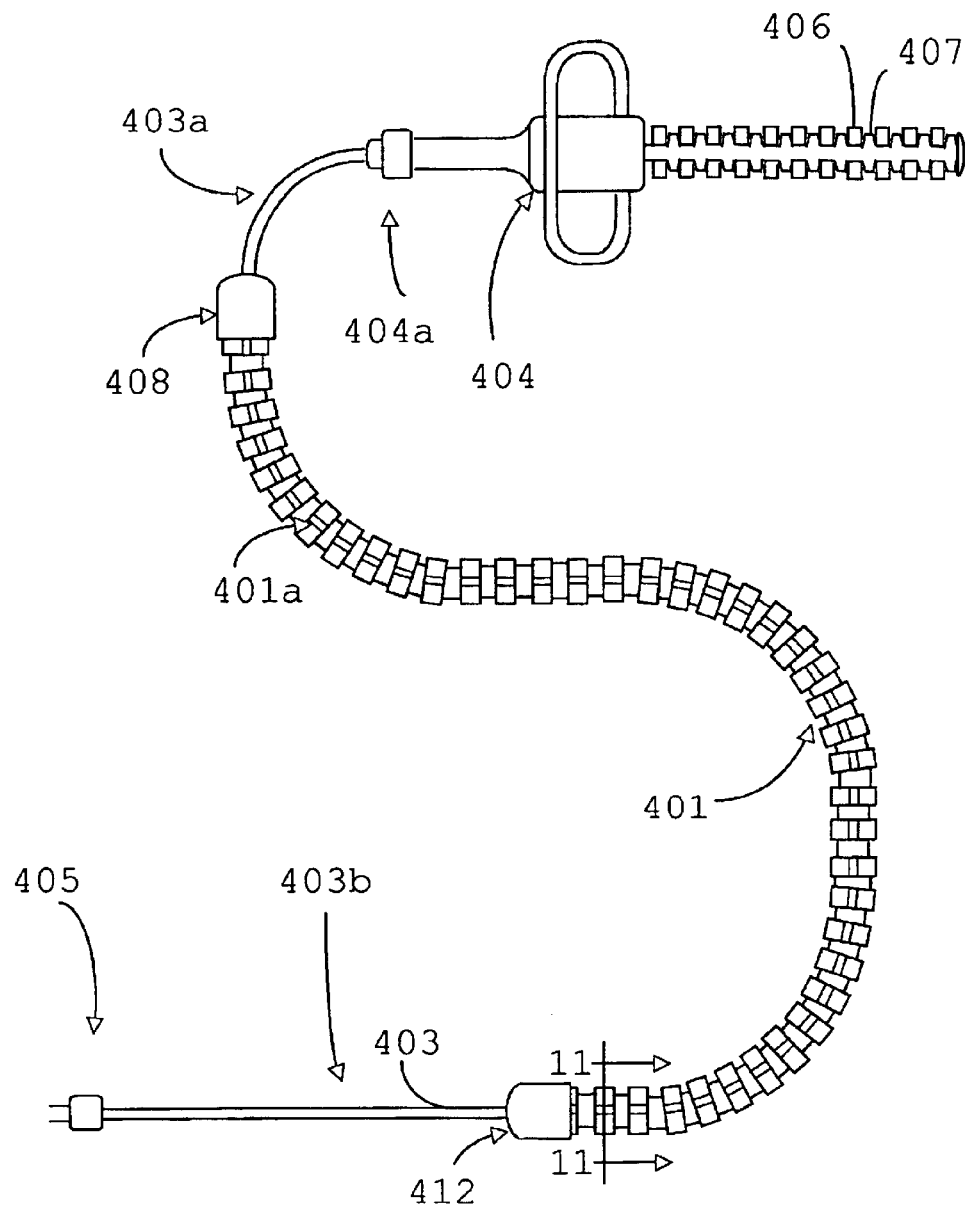
FIG. 10 is a drawing, similar to FIG. 1 and FIG. 5, showing a sleeve with shallow slots for venting instead of holes.

FIG. 10 shows even another alternative embodiment of the present invention with one or more rows of slots for venting sleeve 401, such as slot 401a. The slots may be formed from the kerf left by a saw blade after sawing through only the outer folds of the convolute of sleeve 401. This embodiment is also primarily for manufacturer assembly as previously described for the embodiment of FIG. 5.

Figure 11:
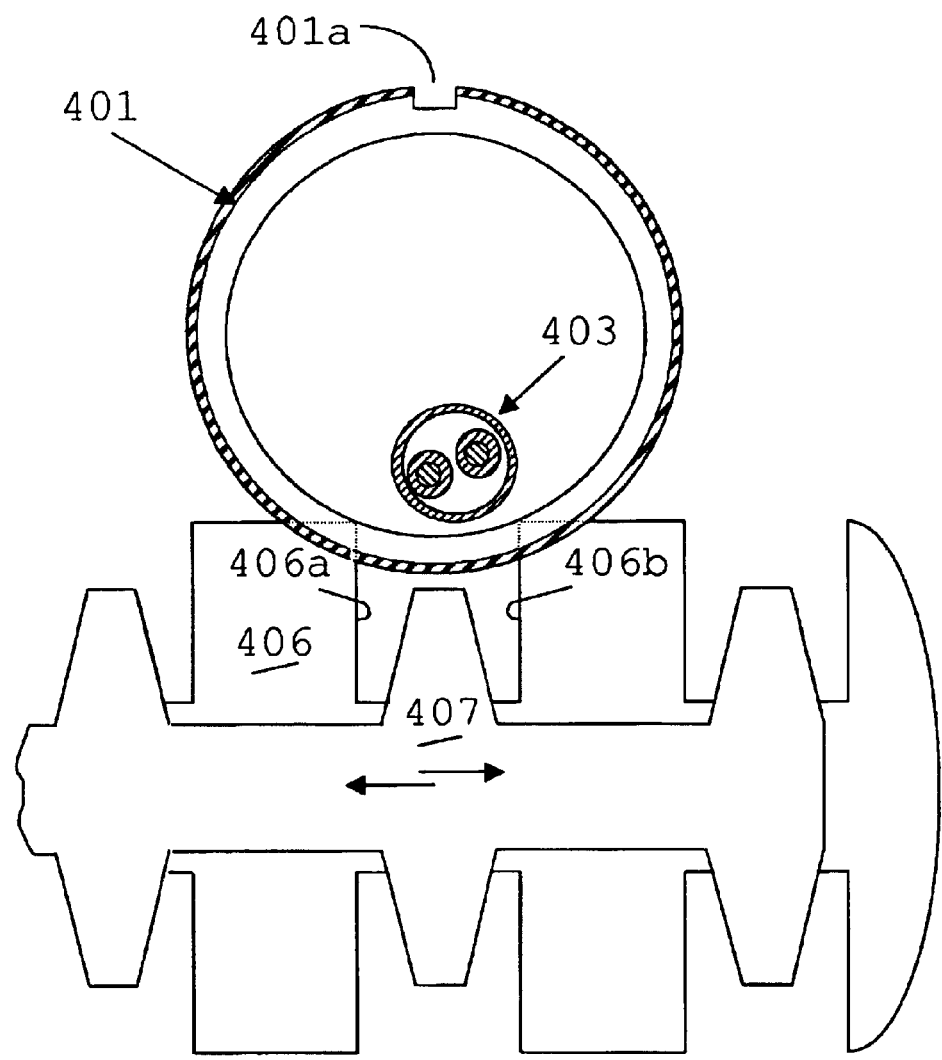
FIG. 11 is a drawing, similar to FIG. 2 and FIG. 6, with a cross-section taken generally along line 11—11 in FIG. 10.
Figure 12:
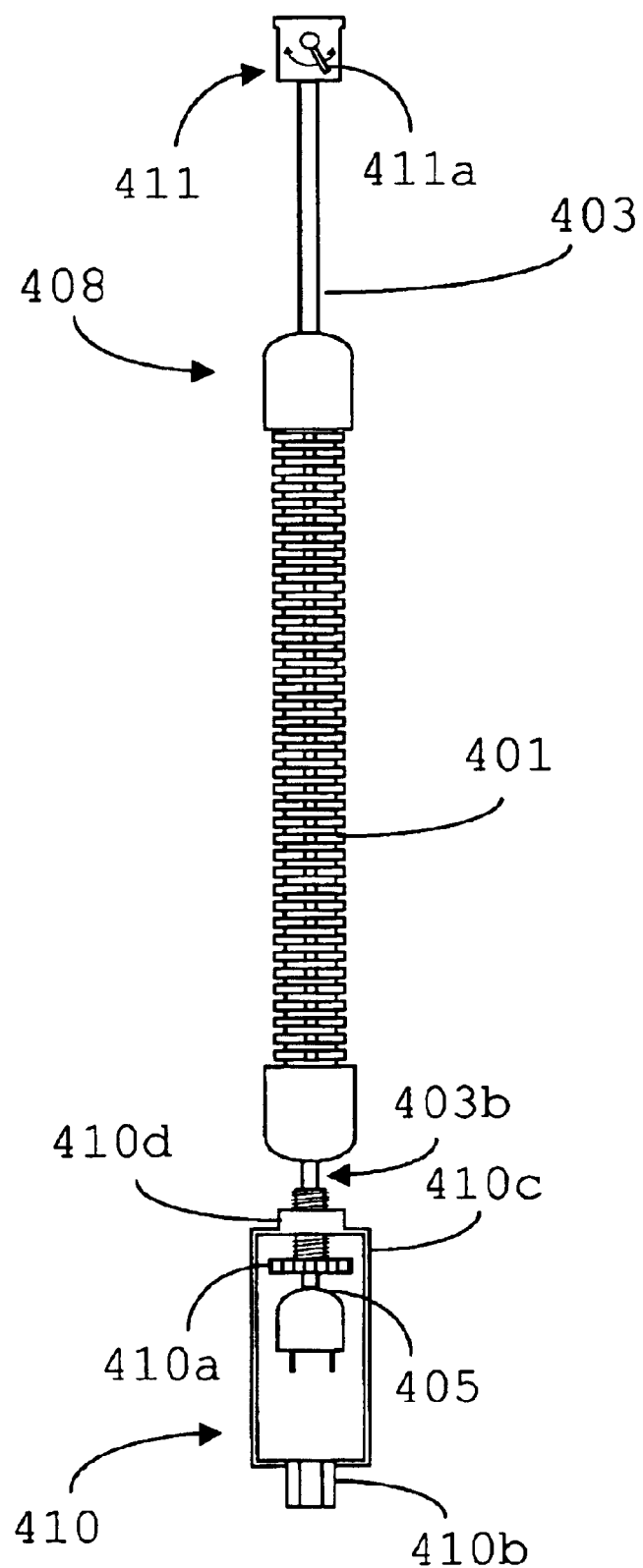
FIG. 12 is a drawing, similar to FIG. 3, FIG. 7 and FIG. 8, showing the embodiment of FIG. 10 in a typical manufacturer assembled form.

FIG. 11 shows the embodiment of FIG. 10 in cross section with functionality similar to that as described for the embodiment of FIG. 2. FIG. 12 shows the embodiment of FIG. 10 with optional features as previously described for the embodiment of FIG. 3.

Figure 13:
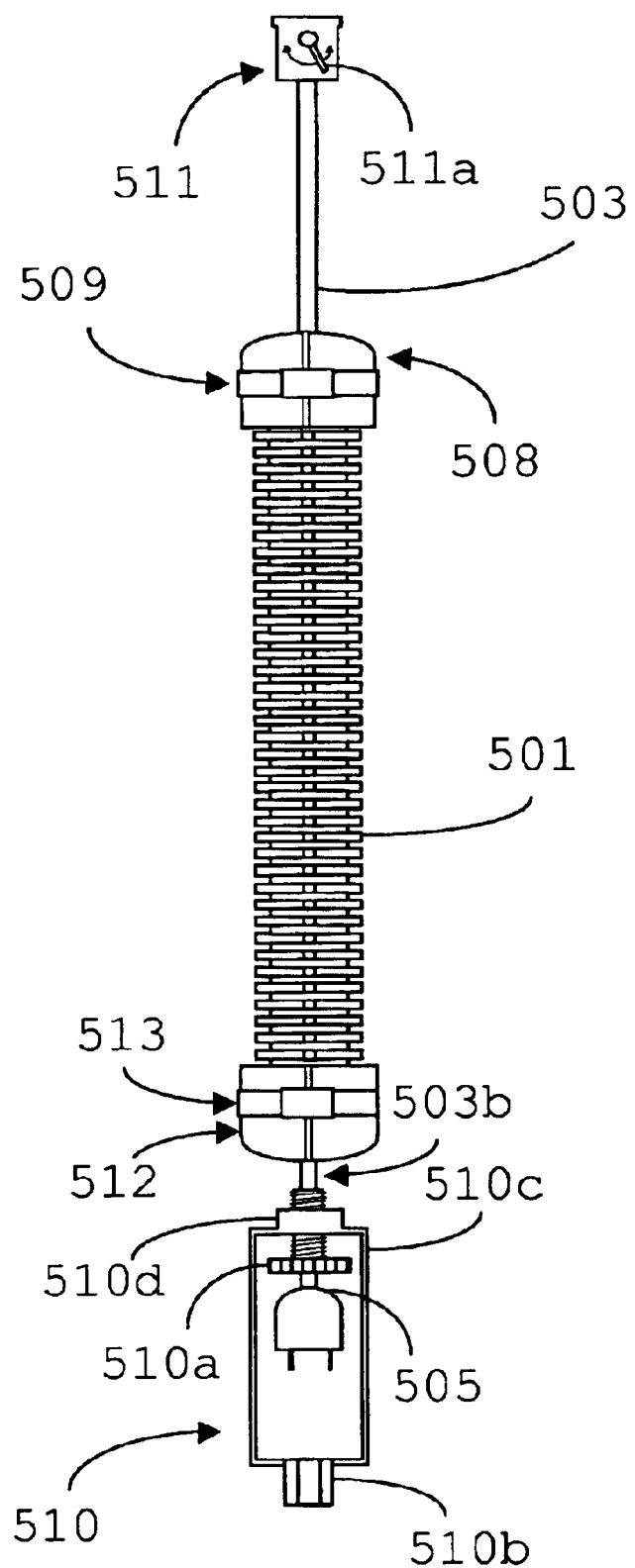
FIG. 13 is a drawing similar to FIG. 8 with a large inside diameter and with shallow slots.
Figure 14:
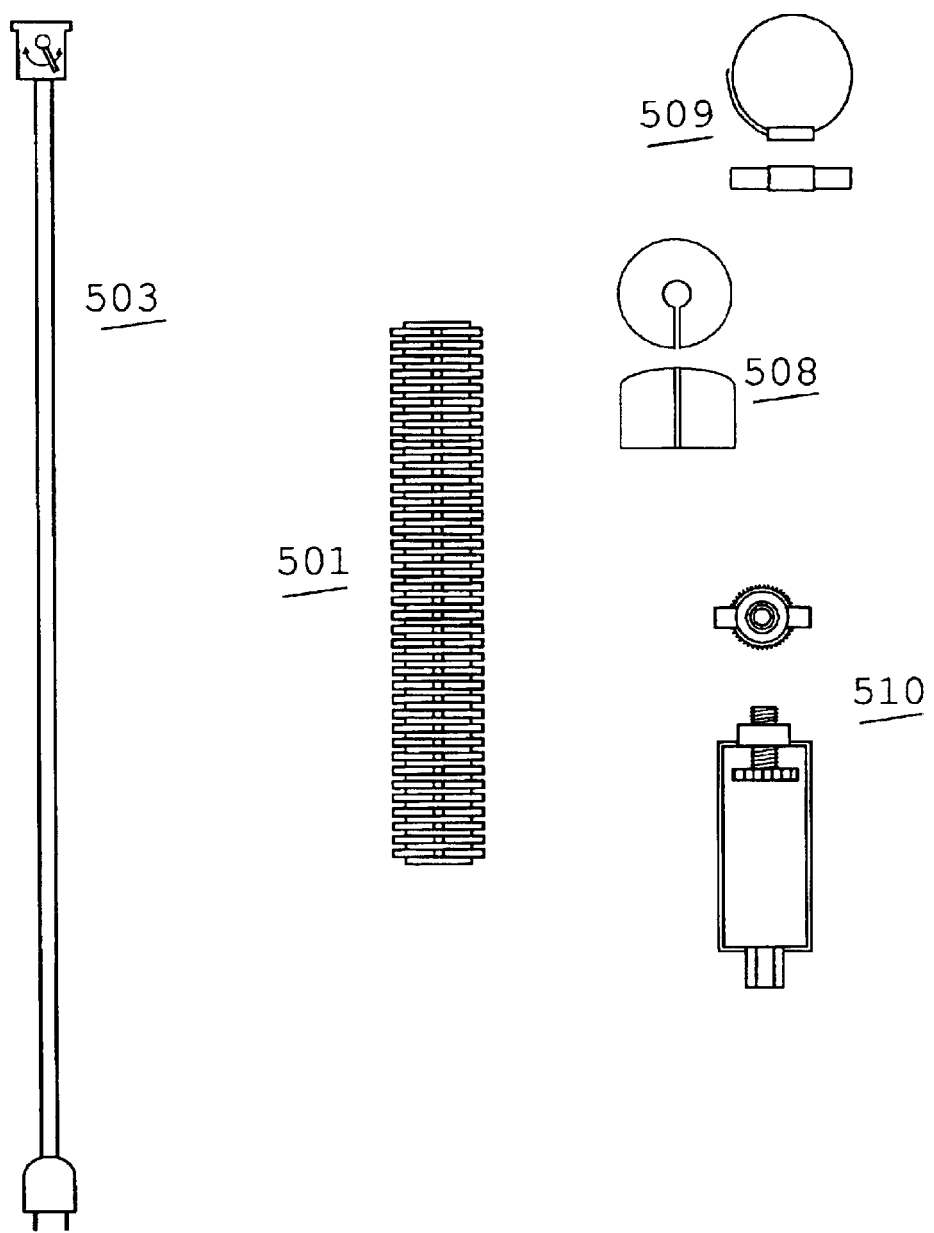
FIG. 14 is a depiction of the components of the embodiment of FIG. 13 shown in kit form.

FIG. 13 shows even yet another embodiment of the present invention with slots as described for the embodiment of FIG. 10 but the sleeve 501 inside diameter is large enough for the receptacle 511 or plug 505 to be pushed or pulled through it by either the user or manufacturer. The assembly and optional features are similar to those as described for the embodiment of FIG. 8. FIG. 14 shows the components of the embodiment of FIG. 13 as may be provided in kit form similarly as described for the embodiment of FIG. 9.

Figure 15:
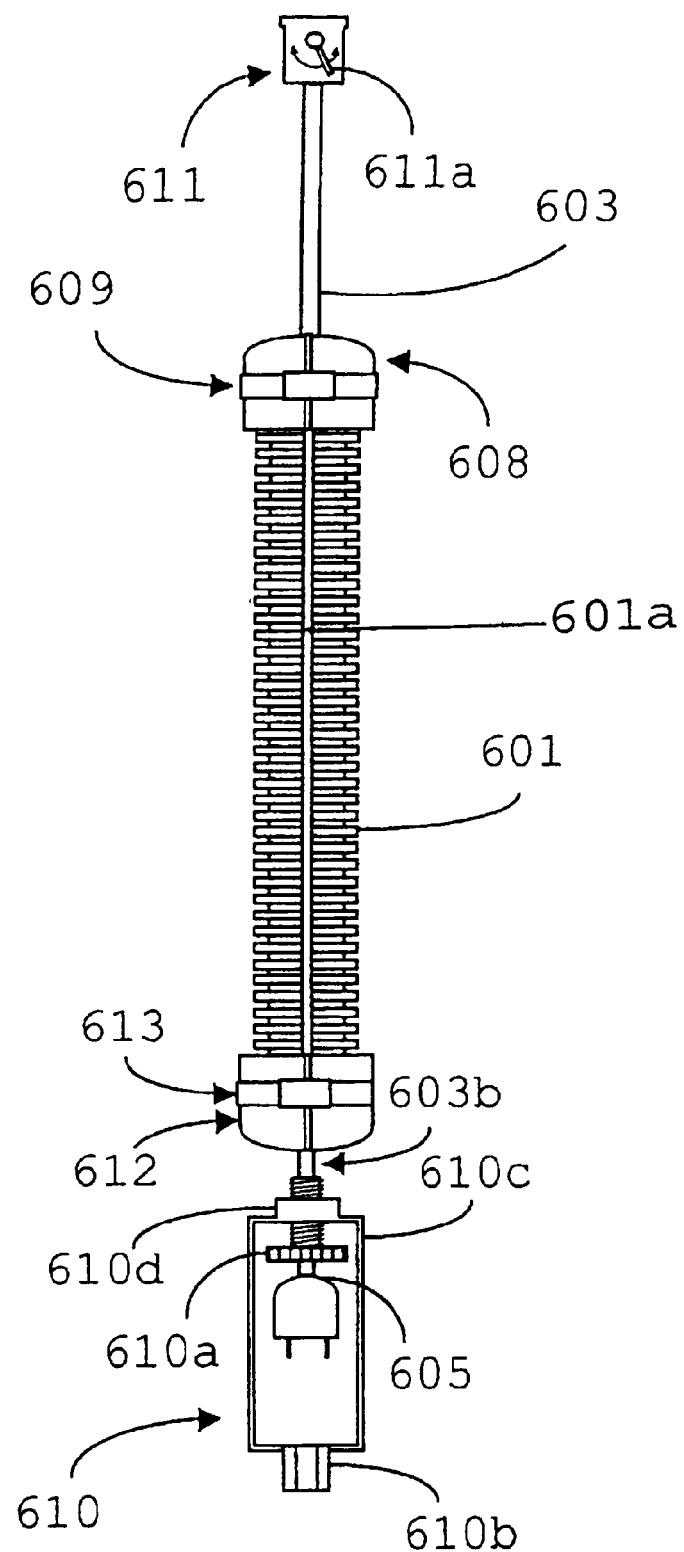
FIG. 15 is a drawing, similar to FIG. 3 and FIG. 7, depicting a sleeve similar to the embodiment of FIG. 1 except with an inside diameter large enough for the cord's plug or receptacle to pass through it during assembly.
Figure 16:
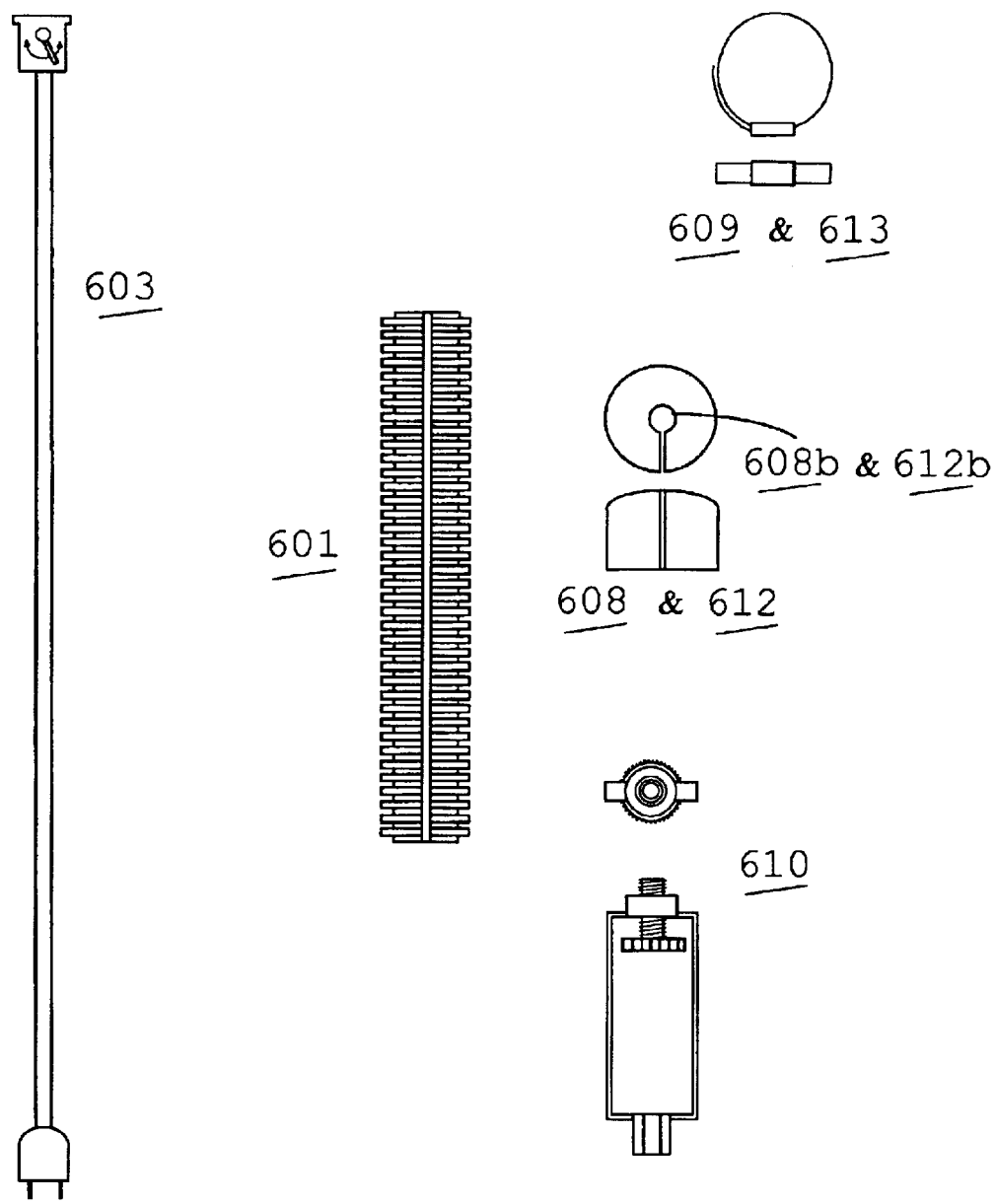
FIG. 16 is a depiction of the components of the embodiment of FIG. 15 shown in kit form.

FIG. 15 shows another alternative embodiment of the present invention similar to the embodiment of FIG. 1 except that the width of sleeve 601 is large enough for the receptacle 611 or plug 605 to be pushed or pulled longitudinally through the hollow region within it to allow user assembly and disassembly. End cap 608, end cap 612, clamp 609, and clamp 613 may be installed as described for the embodiment of FIG. 1. The slot 601a is still present for heat dissipation as described previously. FIG. 16 depicts the components of the embodiment of FIG. 15 as may be provided in kit form similarly as described for the kit in FIG. 4.

Figure 17:
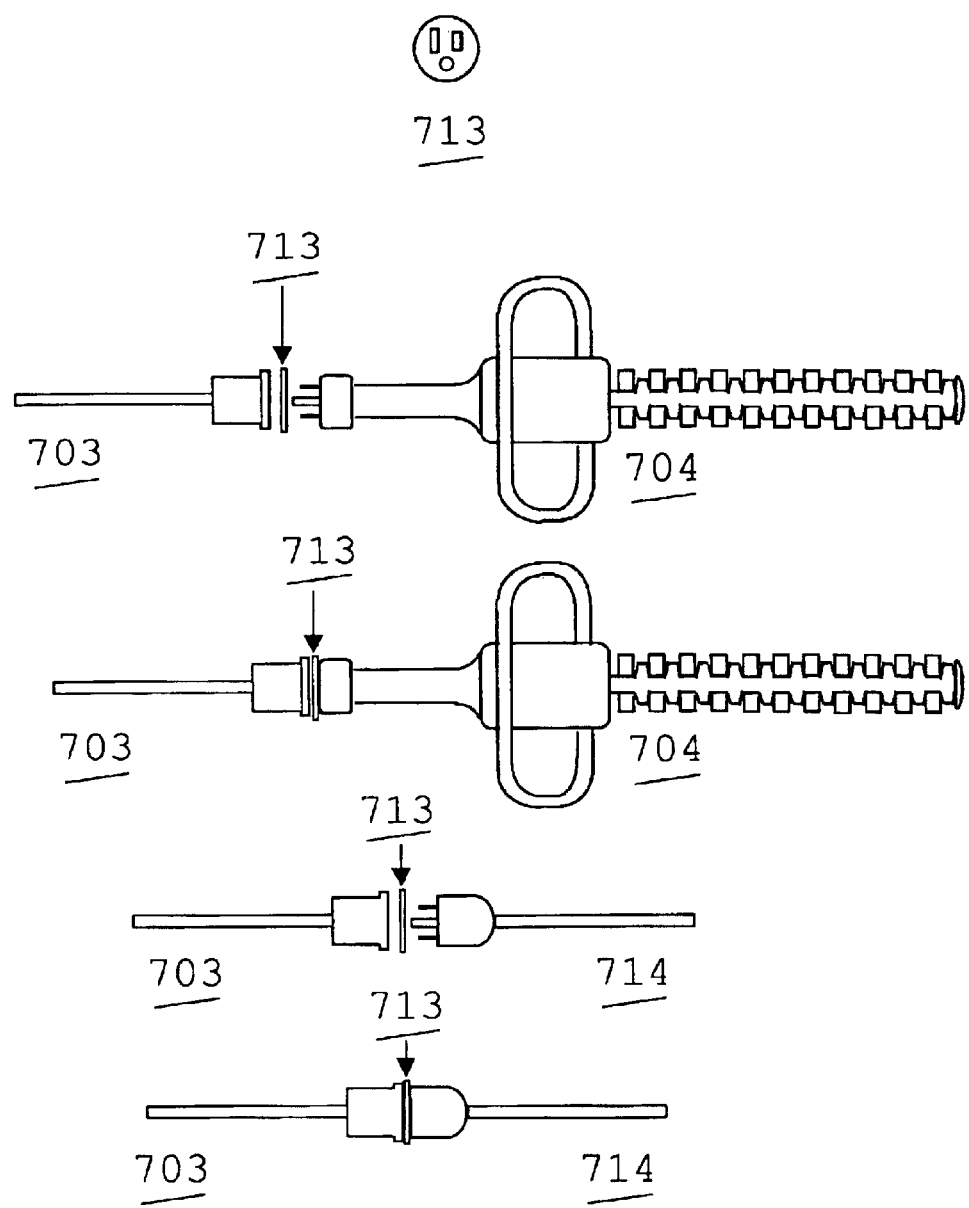
FIG. 17 is a drawing of adhesive pads for holding electrical connector plugs, or appliances with only the electrical blades protruding from their housings, to electrical connector receptacles.

FIG. 17 depicts an adhesive 713, that may include a carrier such as an expanded polymeric foam pad, paper, or cloth with adhesive on both sides or impregnated within, for holding electrical connector plugs, as on cord 714, or appliances with only the electrical blades protruding from their housings, as on hedge trimmer 704, to electrical connector receptacles, as on cord 703.

Figure 18:
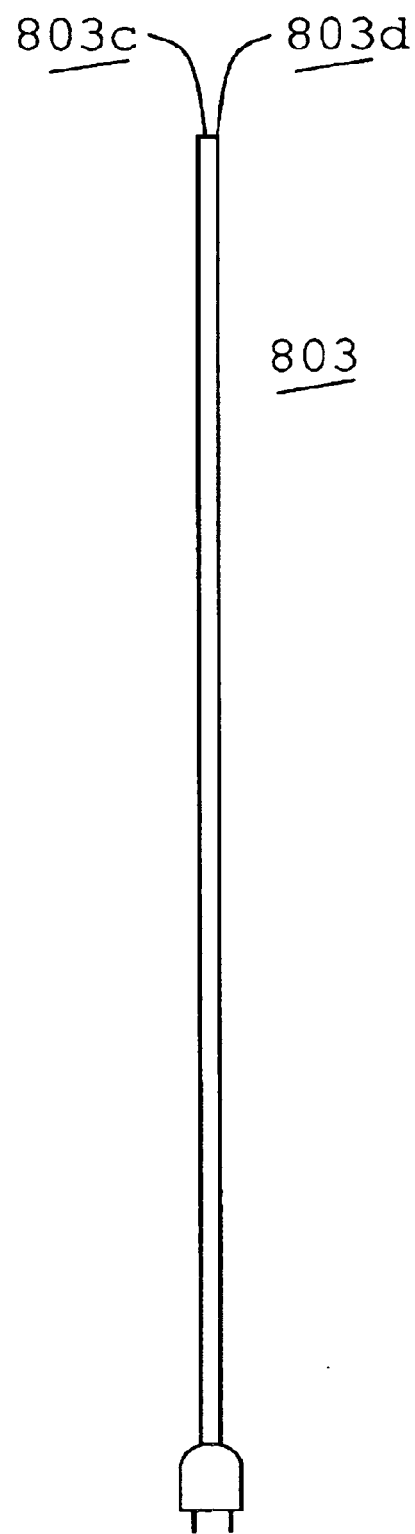
FIG. 18 is a drawing of a cord set that may be used with any embodiment of the present invention.

FIG. 18 shows a typical cord set 803 for use with any of the previously described embodiments in place of the cords shown in the respective Figures. Conductor 803c and conductor 803d may be attached by crimp terminals or soldered connections internally to appliances by the manufacturer or qualified service personnel.

The above references to power cord 103, 203, 303, 403, 503, and 603 are meant to encompass both extension-type cords and power cords manufacturers include with, or as a part of, their appliances, or sell separately.

In addition, the, sleeves of the present invention can be used with cords for appliances such as floor sanders, buffers, and vacuum cleaners with rotating brushes; hand-held saws, drills, nailers, sanders, and buffers; and mowers, trimmers, and edgers. The sleeves of the present invention may also have other cross-sectional shapes such as square, rectangular, semicircular or half-elliptical. The color of the sleeves of the present invention may also be varied to contrast with the background associated with the particular appliance, e.g., the green bushes associated with hedgers or the white walls associated with drills. Furthermore, the sleeves of the present invention are of various lengths to facilitate particular applications, e.g., indoor and outdoor applications Additional benefits achieved by the present invention include, but are not limited to, the following. The larger diameter of the sleeve of the present invention compared with a power cord will cause an appliance to push a power cord using the present invention out of the way rather than entangling the cord, cutting the cord, etc. The larger size of the sleeve compared with a power cord and the contrasting color of the sleeve compared with the cord and the background associated with the appliance will increase the user's awareness of the sleeve and cord, thereby reducing the likelihood of damage to the sleeve or cord. Moreover, the increased rigidity of the sleeve compared with a power cord will increase the manageability of a power cord using the present invention The increased rigidity and size of the protected cord assists in managing the cord to keep it out of the way without becoming entangled with itself or other objects. Also, the protected cord tends to ride on the top of grass or bushes rather than falling down into the grass or bushes The fact that the protective sleeve can be moved relative to the cord or removed from the cord may allow the cord to be easily inspected for wear or damage along its length. Finally, the protective sleeve reduces general wear and tear on the power cord.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A portable electric hedge trimmer, comprising:
   a driven reciprocating toothed blade cooperating with a stationary toothed blade;
   an electrical motor for driving said reciprocating toothed blade;
   an electrical power cord for connecting the electrical motor to an electrical power source;
   a protective sleeve made of a corrugated tube that has a series of crests and roots, said protective sleeve surrounding the outer surface of at least a portion of said power cord and having an outer diameter greater than the space between a pair of adjacent teeth in said stationary blade to protect said cord from damage by accidental contact with said reciprocating toothed blade, said protective sleeve having at least one aperture in said protective sleeve to facilitate the dissipation of heat generated by said power cord; and
   a cylindrical end cap for holding said protective sleeve in place on said power cord, said end cap having an outer diameter dimension that is at least equal to the diameter of said roots, said end cap having a hole in the center that runs longitudinally through the entire length of said end cap, said end cap having a cap slot extending longitudinally through the entire length of said end cap, extending radially through said hole, and that has a width which is smaller than the diameter of said power cord to prevent said power cord from escaping out of said end cap.

2. The portable electric hedge trimmer of claim 1, wherein said end cap is locked into place by locking means to prevent any movement of said power cord relative to said protective sleeve.

3. The portable electric hedge trimmer of claim 2, wherein said locking means is a ratcheting pull-tie, a cable tie, or a clamp.

4. A portable electric hedge trimmer, comprising:
   a driven reciprocating toothed blade cooperating with a stationary toothed blade;
   an electrical motor for driving said reciprocating toothed blade;
   an electrical power cord for connecting the electrical motor to an electrical power source; and
   a protective sleeve made of a corrugated tube that has a series of crests and roots, said protective sleeve surrounding the outer surface of at least a portion of said power cord and having an outer diameter greater than the space between a pair of adjacent teeth in said stationary blade to protect said cord from damage by accidental contact with said reciprocating toothed blade, said protective sleeve having at least one aperture in said protective sleeve to facilitate the dissipation of heat generated by said power cord.

5. The portable electric hedge trimmer of claim 4, wherein said aperture is a slot that extends longitudinally throughout the entire length of said sleeve and that extends radially through both said crests and said roots of said protective sleeve to facilitate the insertion of said power cord into said sleeve, and that has a width which is smaller than the diameter of said power cord to prevent said power cord from escaping out of said protective sleeve.

6. The portable electric hedge trimmer of claim 4, wherein said aperture extends radially only through said crests of said protective sleeve.

7. The portable electric hedge trimmer of claim 6, further comprising a series of apertures created in at least one row, said row having the same direction as the longitudinal direction of said protective sleeve.

8. The portable electric hedge trimmer of claim 6, wherein said protective sleeve has a longitudinal slit that extends throughout the length of said protective sleeve and that extends radially through said crests and said roots in order to allow easy installation and removal of said protective sleeve unto said power cord.

9. The portable electric hedge trimmer of claim 4, wherein said protective sleeve has an inner diameter dimension that will allow said protective sleeve to slide over the receptacle or the plug of said power cord.

10. A portable electric hedge trimmer, comprising:
    a driven reciprocating toothed blade cooperating with a stationary toothed blade;
    an electrical motor for driving said reciprocating toothed blade;

an electrical power cord for connecting the electrical motor to an electrical power source;

a protective sleeve made of a corrugated tube that has a series of crests and roots, said protective sleeve surrounding the outer surface of at least a portion of said power cord and having an outer diameter greater than the space between a pair of adjacent teeth in said stationary blade to protect said cord from damage by accidental contact with said reciprocating toothed blade, said protective sleeve having at least one aperture in said protective sleeve to facilitate the dissipation of heat generated by said power cord; and a polymer pad with two attaching surfaces that have attaching means located on them, said attaching surfaces each being substantially the same size and shape as the face of an electrical connector plug, and at least one aperture that will allow the electrical blades of said electrical plug to pass through said pad.

11. The portable electric hedge trimmer of claim 10, further comprising a cylindrical end cap for holding said protective sleeve in place on said power cord having an outer diameter dimension that is at least equal to the diameter of said roots, said end cap having a hole in the center that runs longitudinally through the entire length of said end cap, said end cap having a cap slot extending longitudinally through the entire length of said end cap, extending radially through said hole, and that has a width which is smaller than the diameter of said power cord to prevent said power cord from escaping out of said end cap.

12. The portable electric hedge trimmer of claim 11, wherein said end cap is locked into place by locking means to prevent any movement of said power cord relative to said protective sleeve.

13. The portable electric hedge trimmer of claim 12, wherein said locking means is a ratcheting pull-tie, a cable tie, or a clamp.

14. The portable electric hedge trimmer of claim 10, wherein said attaching means is an adhesive.

15. A connecting kit used for a portable appliance, comprising:

an electrical power cord for connecting an electrical motor to an electrical power source;

a protective sleeve adapted to protect said power cord from accidental touching with an exposed cutting surface of said portable appliance;

at least one end cap adapted to hold into place said power cord relative to said protective sleeve:

locking means to lock into place said end cap unto said power cord; and a polymer pad with two attaching surfaces that have attaching means located on them, said attaching surfaces each being substantially the same size and shape as the face of an electrical connector plug.

* * * * *